US011722236B1

(12) United States Patent
Clarke et al.

(10) Patent No.: US 11,722,236 B1
(45) Date of Patent: Aug. 8, 2023

(54) POLARIZATION-MAINTAINING WAVELENGTH SELECTIVE SWITCH FOR FREE-SPACE OPTICAL COMMUNICATION (71) Applicant: II-VI Delaware, Inc., Wilmington, DE (US)

(72) Inventors: Ian G. Clarke, Sydney (AU); Massimo Di Blasio, Princeton, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 17/658,053

(22) Filed: Apr. 5, 2022

(51) Int. Cl.
*H04J 14/02* (2006.01)
*H04B 10/11* (2013.01)
*H04B 10/2507* (2013.01)

(52) U.S. Cl.
CPC .......... *H04J 14/0212* (2013.01); *H04B 10/11* (2013.01); *H04B 10/2507* (2013.01)

(58) Field of Classification Search
None
See application file for complete search history.

(56) References Cited

U.S. PATENT DOCUMENTS

| | | | | |
|---|---|---|---|---|
| 5,710,652 A * | 1/1998 | Bloom | ................. | H04B 10/118 398/42 |
| 6,327,063 B1 * | 12/2001 | Rockwell | ............. | H04B 10/118 398/128 |
| 6,330,092 B1 * | 12/2001 | Aronson | ............... | H04B 10/532 398/119 |
| 6,359,712 B1 * | 3/2002 | Kamitani | ........... | H04B 10/1143 398/118 |
| 6,552,833 B2 * | 4/2003 | Liu | .................... | H04Q 11/0005 398/82 |
| 7,003,058 B2 * | 2/2006 | Bach | ....................... | H04J 99/00 356/453 |
| 7,558,447 B2 * | 7/2009 | Suh | .................... | G02B 6/29313 385/16 |
| 7,627,251 B2 * | 12/2009 | Walther | ............. | H04B 10/1143 398/118 |
| 7,920,794 B1 | 4/2011 | Whaley et al. | | |
| 8,064,036 B2 * | 11/2011 | Yue | ....................... | G02F 1/1396 349/196 |
| 8,131,123 B2 * | 3/2012 | Presley | ............. | G02B 6/29313 385/47 |

(Continued)

*Primary Examiner* — Jai M Lee
(74) *Attorney, Agent, or Firm* — Blank Rome LLP (57) ABSTRACT

A free-space optical communication system has a conversion assembly, a fiber array, and a wavelength selective switch (WSS) assembly. The conversion assembly converts circular polarization states of incoming optical signals to linear polarization states and converts linear polarization states to circular polarization states for outgoing optical signals. The fiber array has polarization-maintaining (PM) optical fibers arranged in optical communication between the conversion assembly and the WSS assembly to preserve the linear polarization states of the optical signals. The WSS assembly has free-space optics, such as dispersion element and beam-steering element, with optical axes arranged relative to the PM optical fibers. The WSS assembly selectively switches WDM channels of the optical signals relative to the PM optical fibers. Fast and slow axes of the PM optical fibers are aligned to the optical axes of the free-space optics.

22 Claims, 4 Drawing Sheets

(56) References Cited

U.S. PATENT DOCUMENTS

| | | | | |
|---|---|---|---|---|
| 8,867,016 | B2 * | 10/2014 | Mao | G02B 6/2938 349/196 |
| 9,158,072 | B2 * | 10/2015 | Frisken | G02B 6/3592 |
| 9,581,878 | B2 * | 2/2017 | Xie | G02F 1/295 |
| 9,660,723 | B2 * | 5/2017 | Liu | H04B 10/07957 |
| 10,063,264 | B2 * | 8/2018 | Crouch | H04L 27/04 |
| 10,243,653 | B2 * | 3/2019 | Wiswell | H04B 10/614 |
| 10,476,591 | B2 | 11/2019 | Laycock et al. | |
| 10,530,435 | B2 * | 1/2020 | Ashrafi | H04L 27/2639 |
| 10,637,572 | B1 * | 4/2020 | Carlson | H04B 10/572 |
| 11,009,595 | B1 * | 5/2021 | Carlson | G02B 27/283 |
| 11,190,293 | B1 | 11/2021 | Ducellier | |
| 11,223,420 | B2 | 1/2022 | Haraguchi et al. | |
| 11,368,217 | B2 * | 6/2022 | Kyosuna | H04B 10/67 |
| 2001/0043379 | A1 * | 11/2001 | Bloom | H04B 10/2587 398/128 |
| 2003/0058516 | A1 * | 3/2003 | Scott | H04B 10/1149 359/246 |
| 2006/0056851 | A1 | 3/2006 | Takahashi | |
| 2012/0236216 | A1 | 9/2012 | Sharma et al. | |
| 2016/0021436 | A1 | 1/2016 | Silny et al. | |
| 2017/0346564 | A1 * | 11/2017 | Wiswell | H04B 10/614 |
| 2021/0063782 | A1 | 3/2021 | Asai | |
| 2022/0179282 | A1 * | 6/2022 | Chang | G09G 3/2025 |

\* cited by examiner

POLARIZATION-MAINTAINING WAVELENGTH SELECTIVE SWITCH FOR FREE-SPACE OPTICAL COMMUNICATION

BACKGROUND OF THE DISCLOSURE

The polarization of signal light in optical fiber-based networks is rapidly randomized by birefringence in the optical fibers. Therefore, wavelength selective switches (WSS) generally make no effort to preserve the polarization of the signal light. Typically, WSSs are used in terrestrial applications, but are rarely if ever used in free space applications. In terrestrial applications, coherent transceivers can be used to electronically unscramble the mixing of the polarization of the signal light. However, coherent transceivers use significant power, which is often undesirable in free-space applications.

The subject matter of the present disclosure is directed to overcoming, or at least reducing the effects of, one or more of the problems set forth above.

SUMMARY OF THE DISCLOSURE

A module disclosed herein is used for free-space optical communication using optical signals. The optical signals have wavelength division multiplexed (WDM) channels, and each of the WDM channels has polarization states. The module comprises a polarization conversion assembly, a fiber array, and a wavelength selective switch.

The polarization conversion assembly is configured to convert circular polarization states of incoming ones of the optical signals from the free-space optical communication to linear polarization states and is configured to convert linear polarization states to circular polarization states for outgoing ones of the optical signals of the free-space optical communication. The fiber array is arranged in optical communication with the polarization conversion assembly and has polarization-maintaining optical fibers for the optical signals. Each of the polarization-maintaining optical fibers is configured to preserve the linear polarization states.

The wavelength selective switch is arranged in optical communication with the fiber array and has free-space optics with optical axes. The wavelength selective switch is configured to selectively switch the WDM channels of the optical signals relative to the polarization-maintaining optical fibers. Fast and slow axes of the polarization-maintaining optical fibers of the fiber array are aligned to the optical axes of the free-space optics.

A free-space optical communication system can have a plurality of such modules. Some of the modules may be endpoints having receiver and/or transmitter units. Other modules may be intermediate nodes.

A wavelength selective switch disclosed herein is used for free-space optical communication that uses optical signals. The optical signals have wavelength division multiplexed (WDM) channels, and each of the WDM channels has polarization states. The wavelength selective switch includes a polarization conversion assembly, a fiber array, and free-space optics. The polarization conversion assembly is configured to convert circular polarization states of incoming ones of the optical signals from the free-space optical communication to linear polarization states and is configured to convert linear polarization states to circular polarization states for outgoing ones of the optical signals of the free-space optical communication. The fiber array is arranged in optical communication with the polarization conversion assembly and has polarization-maintaining optical fibers. Each of the polarization-maintaining optical fibers is configured to preserve the linear polarization states; and The free-space optics have optical axes and include a dispersion element and a beam-steering element. The dispersion element is arranged in optical communication with the fiber array. The dispersion element is configured to disperse the optical signals into the WDM channels across a dispersion direction. The beam-steering element is arranged in optical communication with the WDM channels from the dispersion element and is configured to selectively steer the WDM channels back to the dispersion element. Fast and slow axes of the polarization-maintaining optical fibers of the fiber array are aligned to the optical axes of the free-space optics.

A method is used in free-space optical communication that uses optical signals. The optical signals have wavelength division multiplexed (WDM) channels, and each of the WDM channels has polarization states. The method comprises: converting circular polarization states of incoming ones of the optical signals from the free-space optical communication to linear polarization states; converting linear polarization states to circular polarization states for outgoing ones of the optical signals of the free-space optical communication; preserving the linear polarization states of the optical signals using a fiber array having polarization-maintaining optical fibers by aligning fast and slow axes of the optical fibers of the fiber array to optical axes of free-space optics of a wavelength selective switch; and selectively switching the WDM channels of the optical signals relative to the polarization-maintaining optical fibers using the free-space optics of the wavelength selective switch.

The foregoing summary is not intended to summarize each potential embodiment or every aspect of the present disclosure.

DETAILED DESCRIPTION OF THE DISCLOSURE

Figure 1:
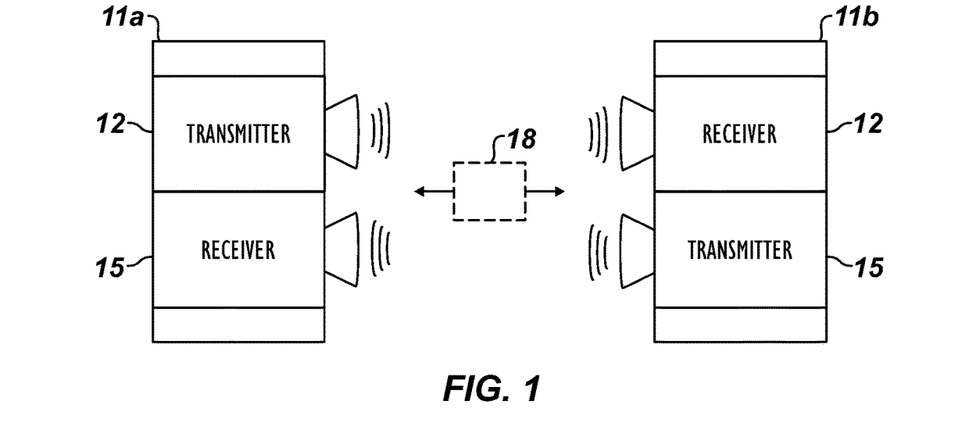
FIG. 1 illustrates a schematic view of a free-space optical communication system according to the present disclosure.

FIG. 1 illustrates a schematic view of a free-space optical communication system 10 according to the present disclosure. The system 10 shown here is bidirectional and has transceiver modules or endpoints 11a-b that can communicate via a free-space optical link.

To transfer data communications over the free-space optical link, the transceiver endpoints 11a-b are aligned with one another. One transceiver endpoint 11a-b converts digital data into one or more light beams and transmits the one or more light beams to the other remotely-located endpoint 11a-b, which can convert the one or more received light beams into one or more corresponding digital data streams.

In general, each transceiver endpoint 11a-b has a transmitter unit 12 and a receiver unit 15. The transmitter unit 12 generates and transmits optical signals as optical beams through the free-space optical link. The receiver unit 15 receives the transmitted optical beams and processes the optical signals.

Typically, the system 10 would have additional endpoints, and other systems may not be bidirectional. For example, some endpoints 11 may have only a transmitter unit 12 or a receiver unit 16. Additionally, an optical signal transmitted from the transmitter unit 12 at one endpoint 11a may often travel through a number of intermediate modules or nodes 18 before reaching a receiver unit 15 at another endpoint 11b. These intermediate nodes 18 may form a mesh, or a ring, allowing optical signals to be routed to many different destinations. Accordingly, these intermediate nodes 18 can act as relays and may not have either one or both of a local transmitter unit 12 and receiver unit 15.

Figure 2:
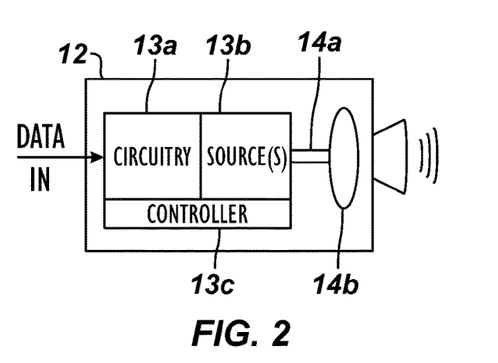
FIG. 2 illustrates a schematic view of a transmitter unit of the system in FIG. 1.
Figure 3:
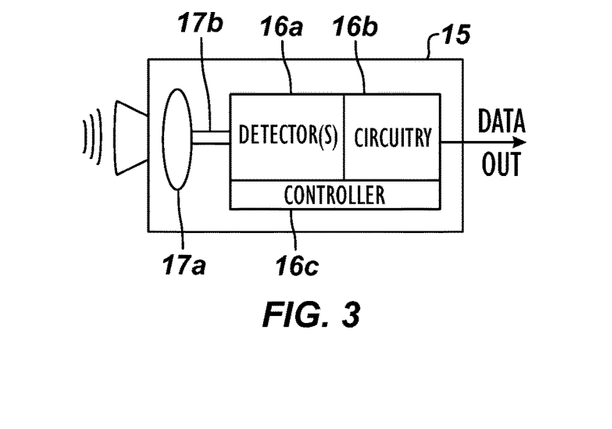
FIG. 3 illustrates a schematic view of a receiver unit of the system in FIG. 1.

FIG. 2 illustrates a schematic view of a transmitter unit 12 of the system 10 in FIG. 1, and FIG. 3 illustrates a schematic view of a receiver unit 15 of the system 10 in FIG. 1. The transmitter unit 12 in FIG. 2 generally includes transmitter circuitry 13a, light source(s) 13b (e.g., laser(s)), and a controller 13c. The controller 13c can be a digital signal processor or the like that controls the circuitry 13a, the source(s) 13b, and transmitter optics 14b.

The transmitter circuitry 13a generally includes laser modulator(s), driver(s), and the like for the laser source(s) 13b to generate optical signals to be transmitted as optical beams through the free-space optical link. To do this, the transmitter circuitry 13a is configured to convert digital data signals into optical signals having modulations of light from the light source(s) 13b. For example, the optical signals include various frequencies of the light from the light source(s) 13b that are amplitude-modulated, phase-modulated, pulse-modulated, and the like and that are multiplexed according to various formats. Optical waveguides 14a, e.g., optical fibers, deliver the optical signals to the transmitter optics 14b, which includes a lens system and movable telescope to transmit the optical signals in optical beam(s) from the transmitter unit 12.

The receiver unit 15 in FIG. 3 generally includes detector(s) 16a, receiver circuitry 16b, and a controller 16c. The controller 16c can be a digital signal processor or the like that controls receiver optics 17a, the detector(s) 16a, and the receiver circuitry 16b. The receiver unit 15 receives the transmitted optical beam(s) incident to its receiver optics 17a, which includes a lens system and movable telescope. Optical waveguides 17b, e.g., optical fibers, deliver the optical signals to the detector(s) 16a, which measure the optical signals. The receiver circuitry 16b processes the responses of the detector(s) 16a and converts the responses into digital data using amplification, filtering, analog-to-digital conversion, and the like. The receiver unit 15 can generally include one or more filters, amplifiers, demodulators, and the like.

In the free-space optical communications, the transmitter unit 12 uses Wavelength Division Multiplexing (WDM) to modulate separate wavelength channels to encode data in an optical signal for transmission. At the receiver unit 15, the different wavelength channels encoding the data in the optical signal are separated by WDM techniques. In free-space optical communications, however, the orientation of the receiver unit 15 is often unknown, especially in the case where the receiver unit 15 is mounted on a ship, an airplane, or a satellite. Yet, circular polarization multiplexing of the optical signals can be attractive because the definition of these polarization states is not affected by the relative orientation of the transmitter unit 12 and receiver unit 16 used. Accordingly, circular polarization multiplexing of the optical signals can be used in the free-space optical communication system 10 between the transmitter unit 12 and the receiver unit 15 of the present disclosure. Such polarization multiplexing in the optical transmission of the system 10 allows information to be transmitted over two orthogonal polarization states. In this way, the system 10 can use polarization division multiplexing by transmitting independently modulated signals over orthogonal polarization states of the same optical wavelengths, which increases the capacity of the free-space optical link.

Accordingly, the transceiver endpoints 11a-b of the present disclosure can include a circular polarization-preserving wavelength selective switch (WSS) for use in free-space applications. Advantageously, the disclosed wavelength selective switch preserves the circular polarization of the optical signals. When the optical signals are communicated in the optical beams through the free-space optical link, the optical signals do not experience the dispersion and scrambling of the polarization states that are produced by optical fibers, such as those produced in optical cables used for terrestrial optical communications. Consequently, the transceiver endpoints 11a-b using the wavelength selective switch of the present disclosure do not require a coherent receiver or associated circuitry, although a coherent receiver could be provided in the endpoints 11a-b.

Figure 4A:
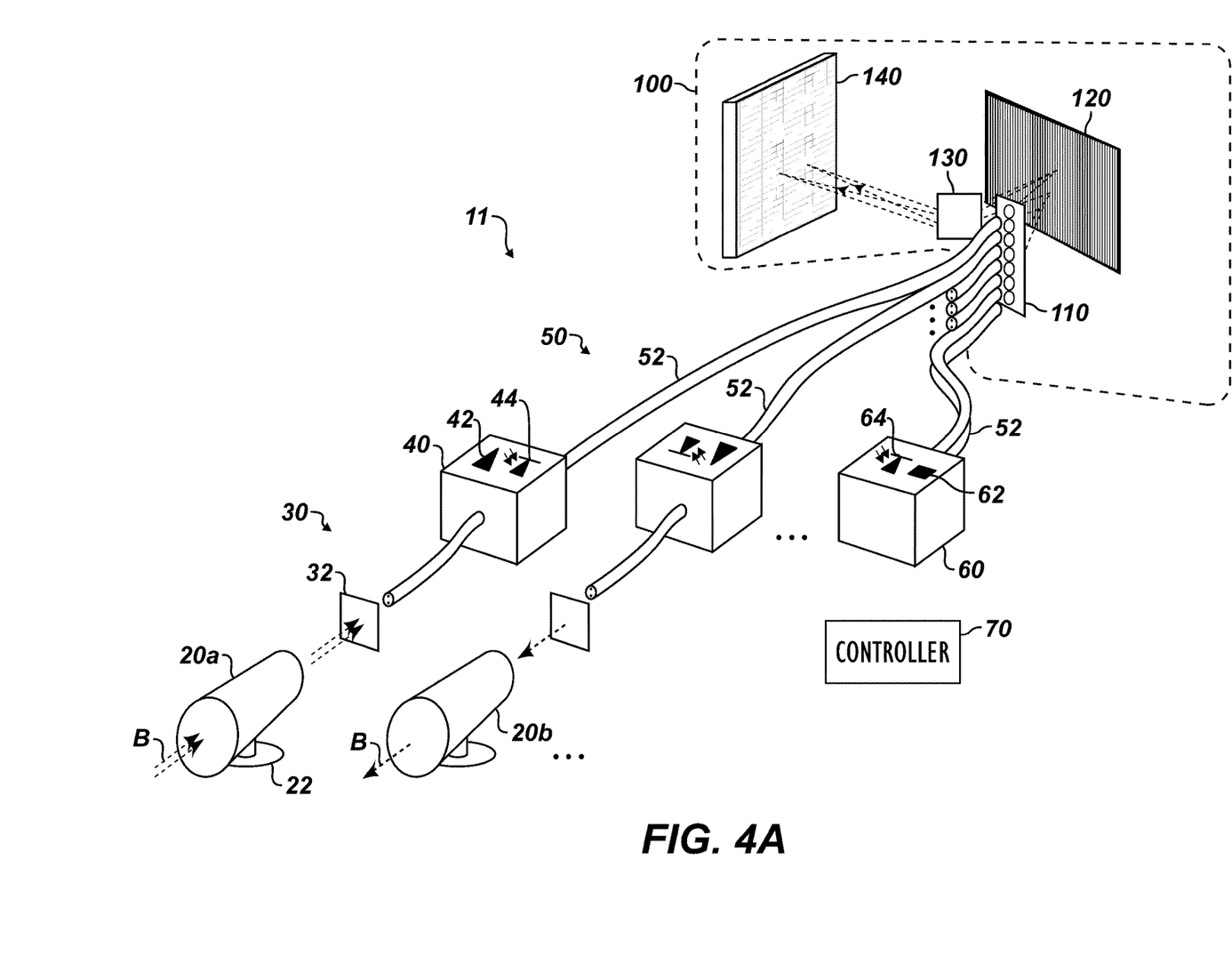
FIG. 4A illustrates a schematic view of an endpoint according to the present disclosure for free-space optical communications.

FIG. 4A illustrates a schematic view of portions of a module or endpoint 11 used in a free-space optical communication system according to the present disclosure. As noted above, the endpoint 11 can be a transceiver, including features of both a transmitter unit and a receiver unit for communicating through free-space with other endpoints.

The endpoint 11 includes couplers 20a-b, a polarization conversion assembly 30, optical circuitry 40, a fiber array 50, transceiver circuitry 60, a controller 70, and a wavelength selective switch 100. In the free-space optical communications, receiving couplers 20a couple incoming optical signals in beams B received from free-space into the endpoint 11, and sending couplers 20b couple outgoing ones of the optical signals in beams B from the endpoint 11 for transmission through free-space. As shown, the couplers 20a-b can include telescopes disposed on gimbal mounts 22 for directing the telescopes.

As noted, the optical signals have wavelength divisional multiplexed (WDM) channels, each having polarization states based on polarization division multiplexing. The polarization states and WDM channels are used to encode information into the optical signals for the free-space optical communications between endpoints 11. In general, the optical wavelengths used for the free-space optical communications can be in the C-band and L-band, but could be expanded.

In this free-space application, the polarization of light is generally unchanged after the optical signals in transmitted beams B leave the sending coupler 20b of the endpoint 11 and reaches a remote receiver coupler of another endpoint. Likewise, the polarization of light is generally unchanged after the optical signals in received beams B leave a remote sending coupler of another endpoint and reach the receiving coupler 20a of the present endpoint 11.

To preserve the polarization of the optical beams B being handled by the endpoint 11, the polarization conversion assembly 30 is configured to convert circular polarization states of the incoming optical signals in the received beams B to linear polarization states for handling in the endpoint 11. Likewise, the polarization conversion assembly 30 is configured to convert the linear polarization states handled in the endpoint 11 to circular polarization states of the outgoing optical signals for beams B transmitted from the sending couplers 20b. In one arrangement, the polarization conversion assembly 30 includes one or more quarter-wave plates 32 arranged in optical communication with the couplers 20a-b and the fiber array 50.

The fiber array 50 has a plurality of polarization-maintaining (PM) optical fibers 52 for the various optical signals. Each of the PM optical fibers 52 is configured to preserve the linear polarization states of the optical signals routed in the endpoint 11. The lens assembly 110 is arranged in optical communication between the fiber array 50 and the wavelength selective switch 100 and is configured to image the optical signals therebetween.

The wavelength selective switch 100 is arranged in optical communication with the fiber array 50 and has several free-space optics 110, 120, 130, and 140 having optical axes. As generally shown in FIG. 4A, the free-space optics of the wavelength selective switch 100 include a lens assembly 110, a dispersion element 120, an optional folding mirror 130, and a beam-steering element 140. In general, the wavelength selective switch 100 is configured to selectively switch the WDM channels of the optical signals relative to the PM optical fibers 52 in the fiber array 50.

The optical circuitry 40 of the endpoint 11 can include optical amplifiers 42 and monitoring photodiodes 44 in optical communication with the fiber array 50. The amplifiers 40 can amplify the optical signals, but they are polarization-preserving amplifiers configured to preserve the linear polarization of the optical signals. The photodiodes 44 can perform optical monitoring of the optical signals.

Additional transceiver circuitry 60 associated with the endpoint 11 is schematically shown and can include those transmitter and receiver components typically used in a transceiver, such as modulators, drivers, laser sources 62, detectors 64, demodulators, etc. The controller 70 is in operational communication with the gimbals 22, the circuitry 40 and 60, the beam-steering element 140, and any other necessary components to control the endpoint 11. For example, the controller 70 can control the amplifiers 42, laser sources 62, etc., and can monitor the responses of the photodiodes 44, 64. To route the WDM channels with the wavelength selective switch 100, the controller 70 can control the beam steering performed by the beam-steering element 140.

Figure 4B:
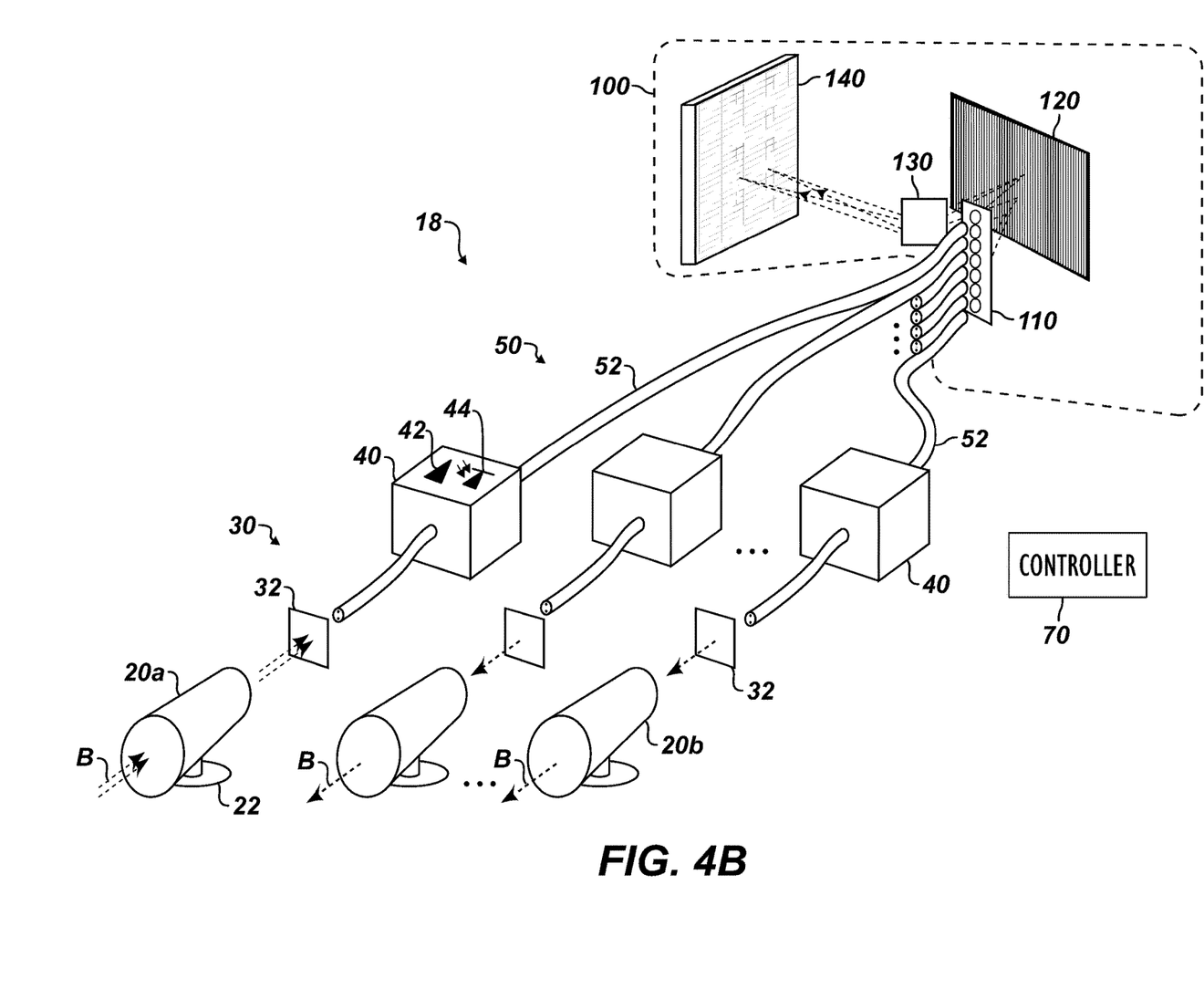
FIG. 4B illustrates a schematic view of an intermediate node according to the present disclosure for free-space optical communications.

FIG. 4B illustrates a schematic view of portions of an intermediate module or node 18 used in a free-space optical communication system according to the present disclosure. As noted previously, an optical signal transmitted from one endpoint may often travel through a number of such intermediate nodes 18 before reaching a receiver unit at another endpoint. The intermediate node 18 may be part of a mesh or a ring arrangement, allowing optical signals to be routed to many different destinations.

As shown here, the intermediate node 18 may not have a local transmitter or receiver unit. However, the intermediate node 18 can have many of the same components as the endpoint 11 of FIG. 4A so like reference numerals are used for comparable components.

Briefly, the intermediate node 18 includes couplers 20a-b, a polarization conversion assembly 30, optical circuitry 40, a fiber array 50, a controller 70, and a wavelength selective switch 100. In the free-space optical communications, receiving couplers 20a couple incoming optical signals in beams B received from free-space into the intermediate node 18, and sending couplers 20b couple outgoing ones of the optical signals in beams B from the intermediate node 18 for transmission through free-space. As shown, the couplers 20a-b can include telescopes disposed on gimbal mounts 22 for directing the telescopes.

To preserve the polarization of the optical beams B being handled by the intermediate node 18, the polarization conversion assembly 30 is configured to convert circular polarization states of the incoming optical signals in the received beams B to linear polarization states for handling in the intermediate node 18. Likewise, the polarization conversion assembly 30 is configured to convert the linear polarization states handled in the intermediate node 18 to circular polarization states of the outgoing optical signals for beams B transmitted from the sending couplers 20b.

As before, the fiber array 50 has a plurality of polarization-maintaining (PM) optical fibers 52 for the various optical signals. Each of the PM optical fibers 52 is configured to preserve the linear polarization states of the optical signals routed in the intermediate node 18. The lens assembly 110 is arranged in optical communication between the fiber array 50 and the wavelength selective switch 100 and is configured to image the optical signals therebetween.

As before, the optical circuitry 40 of the intermediate node 18 can include optical amplifiers 42 and monitoring photodiodes 44 in optical communication with the fiber array 50. The amplifiers 40 can amplify the optical signals, but they are polarization-preserving amplifiers configured to preserve the linear polarization of the optical signals. The photodiodes 44 can perform optical monitoring of the optical signals.

Finally, the wavelength selective switch 100 is arranged in optical communication with the fiber array 50 and has several free-space optics 110, 120, 130, and 140 having optical axes. Again, the free-space optics of the wavelength selective switch 100 include a lens assembly 110, a dispersion element 120, an optional folding mirror 130, and a beam-steering element 140. In general, the wavelength selective switch 100 is configured to selectively switch the WDM channels of the optical signals relative to the PM optical fibers 52 in the fiber array 50 so incoming signals from beams received at receiving couplers 20a can be output as outgoing signals in beams from the sending couplers 20b.

Figure 5:
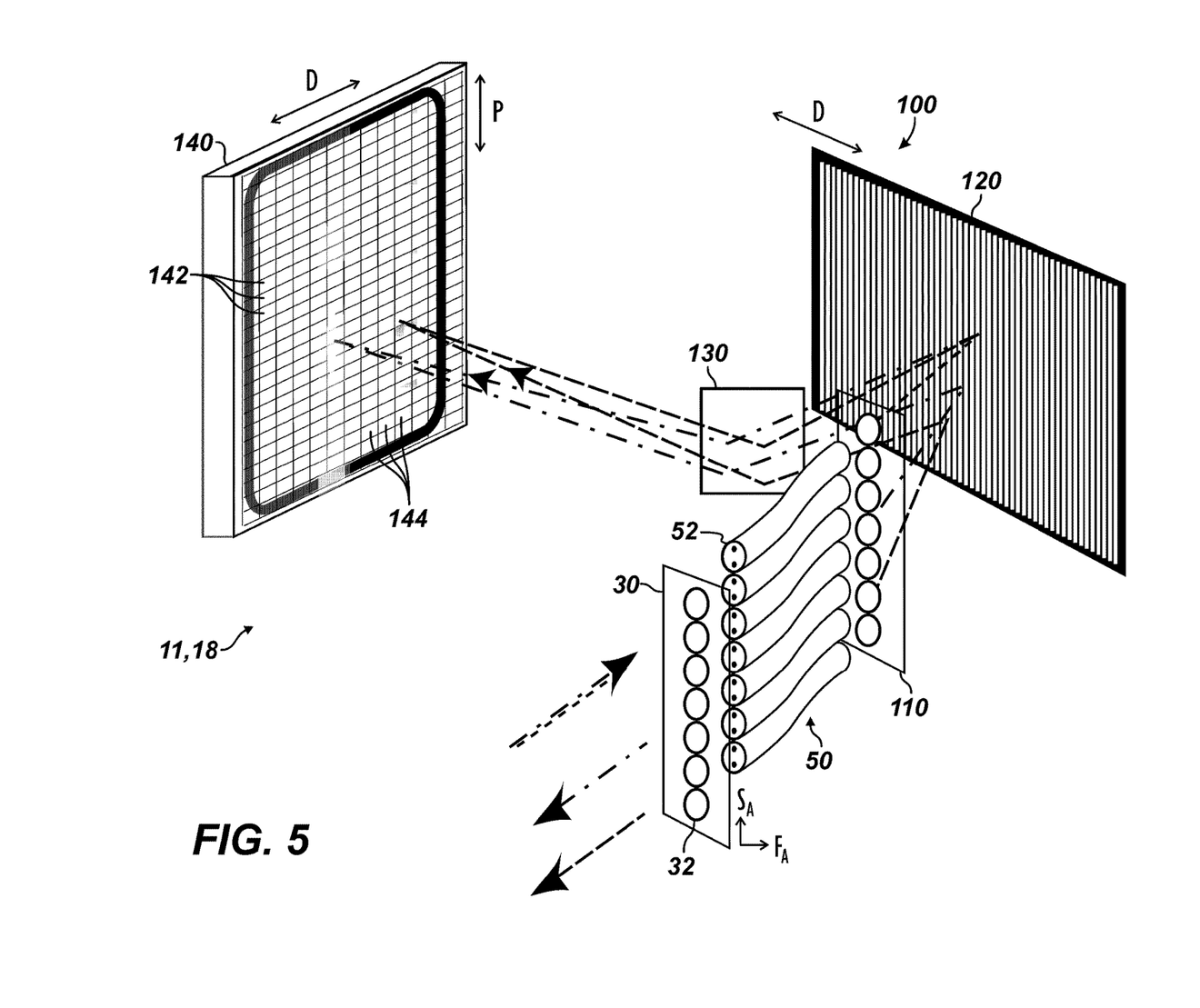
FIG. 5 illustrates a schematic view of an assembly for a circular polarization-preserving wavelength selective switch according to the present disclosure for the modules of FIGS. 4A-4B.

FIG. 5 illustrates an isolated view of an assembly for the wavelength selective switch 100 according to the present disclosure for use in a module (i.e., endpoint 11 or intermediate node 18) of the system 10. The assembly is shown in a 3-dimensional view in a simplified arrangement for clarity.

As noted above, the wavelength selective switch 100 includes a polarization conversion assembly 30, a fiber array 50, a lens assembly 110, a dispersion element 120, a folding mirror 130, and a beam-steering element 140.

In general, the polarization conversion assembly 30 includes one or more conversion devices 32 incorporated in the optical path and configured to convert circular polarization states to linear polarization states and to convert linear polarization states to circular polarization states. In one arrangement, the conversion devices 32 can be quarter-wave plates arranged in optical communication with the PM optical fibers 52 of the fiber array 50 and having low wavelength dependence. As quarter-wave plates, the conversion devices 32 can use an achromatic quarter-wave plate device with its optical axis at 45 degrees to the principal axes of the PM optical fiber 52 associated with the device 32.

As an alternative, the conversion devices 32 can be Fresnel Rhomb devices arranged in optical communication with the PM optical fibers 52 of the fiber array 50. The Fresnel Rhomb device 32 can be similarly mounted with its optical axis at 45 degrees to the principal axes of the PM optical fiber 52 associated with the device 32. As another alternative, the conversion devices 32 can use fiber-based devices made from short lengths of birefringent optical fibers spliced directly on the ends of the associated PM optical fiber 52 of the array 50. The optical axes of the spliced fiber-based device 32 are set at 45 degrees to the principal axes of the associated PM optical fiber 52 of the array 50.

To preserve the linear polarization states, the fiber array 50 maintains the linear polarization of the optical signals and has fast and slow axes (FA, SA) aligned to the optical axes of the free space optics 110, 120, 130, and 140 of the wavelength selective switch 100. Therefore, the PM optical fibers 52 are carefully aligned in the wavelength selective switch 100 and are not just low-birefringent optical fibers. The PM optical fibers 52 are designed with linear birefringence and can include a core centered between opposing stress cords surrounded by cladding. Other configurations can be used.

For the transceiver arrangement shown in FIG. 4A, some of the PM optical fibers 52 are input fibers for received (incoming) optical signals, while some of the PM optical fibers 52 are output fibers for transmitted (outgoing) optical signals. Additionally, some of the PM optical fibers 52 connect to the transceiver circuitry (60; FIG. 4A) having transmitter components to generate optical signals and having receiver components to detect optical signals. For the relay arrangement shown in FIG. 4B, some of the PM optical fibers 52 are input fibers for incoming optical signals, while some of the PM optical fibers 52 are output fibers for outgoing optical signals.

In handling the incoming optical signals, the conversion devices 32 (e.g., quarter-waveplates) at the input PM optical fibers 52 of the wavelength selective switch 100 convert the two circular polarization modes of the received optical signals into two orthogonal linear polarization states. The optical signals are then coupled into the PM optical fibers 52, which are aligned at the front-end with the horizontal and vertical modes of the bulk optics 110, 120, 130, 140 of the wavelength selected switch 100.

In handling the outgoing optical signals to be transmitted, the conversion devices 32 (e.g., quarter-waveplates) at the output PM optical fibers 52 of the wavelength selective switch 100 convert the linear polarization states back into the respective left and right circular polarization states. The lens assembly 110 can include polarization diversity optics and one or more lenses to image the optical signals while preserving polarization.

As shown, the dispersion element 120 is arranged in optical communication with the fiber array 50 through the lens assembly 110. The dispersion element 120 is configured to disperse the optical signals into the WDM channels across a dispersion direction (D). The beam-steering element 140 is arranged in optical communication with the dispersed WDM channels from the dispersion element 120 and is configured to selectively steer the WDM channels in a port direction (P) back to the dispersion element 120.

In general, the dispersion element 120 can be a diffraction grating, a prism, an arrayed waveguide grating, or another device available in the art. In general, the beam-steering element 140 can be a liquid crystal (LC) switch engine, a liquid-crystal-on-silicon (LCoS) switch engine, a plurality of microelectromechanical systems (MEMS) mirrors, a Digital Micro-mirror Device (DMD), an optical phase array, or the like. As shown here, the beam-steering element 140 can be a liquid-crystal-on-silicon (LCoS) switch engine that uses LCoS cells as steering elements. The folding mirror 130 can be arranged in optical communication between the dispersion element 120 and the beam-steering element 140 to provide a more compact arrangement.

As discussed previously, the module (e.g., endpoint 11 or intermediate node 18) does not need circuitry associated with a coherent receiver to perform polarization descrambling of the optical signals. However, even if coherent circuitry is used, the zero-dispersion environment of the free-space optical link means that the module (11 or 18) does not need any finite impulse response (FIR) filter de-scrambling/tracking as conventionally used for a coherent transceiver. This would give the module (11 or 18) a significant energy saving because polarization descrambling is not required based on the assembly of the present disclosure.

The PM optical fibers 52 are arranged in a port direction (P) in the array. Incoming optical signals from input ones of the PM optical fibers 52 have linear polarization states from the quarter waveplates 32. Being polarization-maintaining, the input PM optical fibers 52 maintain the linear polarization and are optically coupled to the dispersion element 120, which can be a diffraction grating as noted. The dispersion element 120 disperses the WDM channels of the optical signals in the dispersion direction (D). The optical signals pass to the folding mirror 130 and then to the beam-steering element 140.

The beam-steering element 140 has windows 142 arranged in an array relative to the port direction (P), and each window 142 has cells 144 arranged in the dispersion direction (D). Depending on the switch engine used, each cell 144 can be comprised of one or more individually operable pixels, mirrors, etc. For example, these cells 144 can include one or more pixels of an LC switching engine or an LCoS switching engine 142 depending on the configuration, the size of the individual pixels, and the like.

The port direction (P) is arranged to match the arrangement of PM optical fibers 52. The dispersion direction (D) is arranged to match the dispersion of the WDM channels by the dispersion element 120. In this way, the wavelength selective switch 100 has a group of input and output PM optical fibers 52 with their own control windows 142 of the beam-steering element 140.

During use, the wavelength selective switch 100 is configured to receive incoming optical signals that have the WDM channels with the linear polarization states. The dispersion element 120 separates the optical signals into the component WDM channels. The separate component WDM channels are communicated to the beam-steering element 140. If needed, the folding mirror 130, a focusing lens (not shown), and the like can be used in the optical path. The beam-steering element 140 selectively returns the component WDM channels in reverse order back from the beam-steering element 140 to the folding mirror 130 and the dispersion element 120. The component WDM channels are then coupled back to the output ones of the PM optical fibers 52 via the coupling.

For wavelength selective switching, the component WDM channels are coupled to the optical switching performed by the control windows 142 and cells 144, which switch the angle of the component WDM channel, directing it towards the selected output optical fiber in the fiber array 52. The wavelength selective switch 100 uses the control windows 142 and cells 144 to dynamically route, block, and attenuate the channels in the WDM optical signal. For example, each wavelength channel of the optical signal at an input PM optical fiber 52 can be switched (routed) to any one of the output PM optical fibers 52, and the routing can be performed independent of how any of the other WDM channels are routed.

In this way, optical signals generated by transmitter circuitry (60; FIG. 4A) in the module as an endpoint (11) can be switched (routed) to any one of the output PM optical fibers 52 to be transmitted from the module (11). Optical signals received by the endpoint (11) can be switched (routed) to any one of the input PM optical fibers 52 to be detected by receiver circuitry (60; FIG. 4A) in the endpoint 11 or can be switched (routed) to any one of the output PM optical fibers 52 to be relayed from the endpoint (11). Likewise, optical signals received at the module as an intermediate node (18) can be switched (routed) to any one of the output PM optical fibers 52 to be relayed from the intermediate node (18).

A control interface with the wavelength selective switch 100 either from an integrated controller (not shown) or external controller (70; FIGS. 4A-B) can dynamically change the wavelength switching (routing) performed by operating the beam-steering element 140 integrated into the wavelength selective switch 100.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A module for free-space optical communication using optical signals, the optical signals having wavelength division multiplexed (WDM) channels, each of the WDM channels having polarization states, the module comprising:
    a polarization conversion assembly being configured to convert circular polarization states of incoming ones of the optical signals from the free-space optical communication to linear polarization states and being configured to convert linear polarization states to circular polarization states for outgoing ones of the optical signals of the free-space optical communication;
    a fiber array arranged in optical communication with the polarization conversion assembly and having polarization-maintaining optical fibers for the optical signals, each of the polarization-maintaining optical fibers being configured to preserve the linear polarization states; and
    a wavelength selective switch arranged in optical communication with the fiber array and having free-space optics with optical axes, the wavelength selective switch being configured to selectively switch the WDM channels of the optical signals relative to the polarization-maintaining optical fibers, wherein fast and slow axes of the polarization-maintaining optical fibers of the fiber array are aligned to the optical axes of the free-space optics.

2. The module of claim 1, wherein the polarization conversion assembly comprises one or more of: a quarter-wave plate having an optical axis set at 45 degrees relative to principal axes of an associated one of the polarization-maintaining optical fibers; a Fresnel Rhomb having an optical axis set at 45 degrees relative to the principal axes of the associated polarization-maintaining optical fiber; and a short length of birefringent optical fiber spliced directly on an end of the associated polarization-maintaining optical fiber and having an optical axis set at 45 degrees to the principal axes thereof.

3. The module of claim 1, wherein the free-space optics of the wavelength selective switch comprise:
    a dispersion element arranged in optical communication with the fiber array, the dispersion element being configured to disperse the optical signals into the WDM channels across a dispersion direction; and
    a beam-steering element arranged in optical communication with the WDM channels from the dispersion element and being configured to selectively steer the WDM channels back to the dispersion element.

4. The module of claim 3, wherein the free-space optics of the wavelength selective switch comprises a lens assembly arranged in optical communication between the fiber array and the dispersion element and being configured to image the optical signals therebetween.

5. The module of claim 4, wherein the lens assembly comprises polarization diversity optics.

6. The module of claim 3, wherein the free-space optics of the wavelength selective switch comprises a folding mirror arranged in optical communication between the dispersion element and the beam-steering element.

7. The module of claim 3, wherein the dispersion element comprises a diffraction grating, a prism, or an arrayed waveguide grating.

8. The module of claim 3, wherein the beam-steering element comprises a liquid crystal (LC) switch engine, a liquid-crystal-on-silicon (LCoS) switch engine, a plurality of microelectromechanical systems (MEMS) mirrors, a Digital Micro-mirror Device (DMD), and an optical phase array.

9. The module of claim 1, further comprising a plurality of couplers being configured to couple the incoming ones of the optical signals from the free-space optical communication and being configured to couple the outgoing ones of the optical signals to the free-space optical communication.

10. The module of claim 9, wherein the couplers comprise telescopes on gimbal mounts.

11. The module of claim 1, further comprising optical amplifiers arranged in optical communication with the fiber array and being configured to preserve the linear polarization of the optical signals.

12. The module of claim 1, further comprising detectors arranged in optical communication with the fiber array and being configured to measure responses associated with the optical signals.

13. A free-space optical communication system having a plurality of the modules according to claim 1.

14. A wavelength selective switch for free-space optical communication using optical signals, the optical signals having wavelength division multiplexed (WDM) channels, each of the WDM channels having polarization states, the wavelength selective switch comprising:
    a polarization conversion assembly being configured to convert circular polarization states of incoming ones of the optical signals from the free-space optical communication to linear polarization states and being configured to convert linear polarization states to circular polarization states for outgoing ones of the optical signals of the free-space optical communication;

a fiber array arranged in optical communication with the polarization conversion assembly and having polarization-maintaining optical fibers, each of the polarization-maintaining optical fibers being configured to preserve the linear polarization states; and free-space optics having optical axes and including:
a dispersion element arranged in optical communication with the fiber array, the dispersion element being configured to disperse the optical signals into the WDM channels across a dispersion direction; and
a beam-steering element arranged in optical communication with the WDM channels from the dispersion element and being configured to selectively steer the WDM channels back to the dispersion element,
wherein fast and slow axes of the polarization-maintaining optical fibers of the fiber array are aligned to the optical axes of the free-space optics.

15. A method used in free-space optical communication that uses optical signals, the optical signals having wavelength division multiplexed (WDM) channels, each of the WDM channels having polarization states, the method comprising:

converting circular polarization states of incoming ones of the optical signals from the free-space optical communication to linear polarization states;

converting linear polarization states to circular polarization states for outgoing ones of the optical signals of the free-space optical communication;

preserving the linear polarization states of the optical signals using a fiber array having polarization-maintaining optical fibers by aligning fast and slow axes of the optical fibers of the fiber array to optical axes of free-space optics of a wavelength selective switch; and selectively switching the WDM channels of the optical signals relative to the polarization-maintaining optical fibers using the free-space optics of the wavelength selective switch.

16. The method of claim 15, wherein converting the circular polarization states and converting the linear polarization states comprises optically coupling the incoming and outgoing optical signals through one or more of: a quarter-wave plate having an optical axis set at 45 degrees relative to principal axes of an associated one of the polarization-maintaining optical fibers; a Fresnel Rhomb having an optical axis set at 45 degrees relative to the principal axes of the associated polarization-maintaining optical fiber; and a short length of birefringent optical fiber spliced directly on an end of the associated polarization-maintaining optical fiber and having an optical axis set at 45 degrees to the principal axes thereof.

17. The method of claim 15, wherein selectively switching the WDM channels of the optical signals relative to the polarization-maintaining optical fibers using the free-space optics of the wavelength selective switch comprises:

dispersing the optical signals into the WDM channels across a dispersion direction using a dispersion element of the free-space optics arranged in optical communication with the fiber array; and selectively beam-steering the WDM channels from the dispersion element back to the dispersion element using a beam-steering element of the free-space optics.

18. The method of claim 17, comprising imaging the optical signals with a lens assembly arranged in optical communication between the fiber array and the dispersion element.

19. The method of claim 17, comprising folding the WDM channels with a folding mirror arranged in optical communication between the dispersion element and the beam-steering element.

20. The method of claim 15, further comprising coupling the incoming ones of the optical signals from the free-space optical communication with a plurality of couplers in optical communication with the optical fibers of the fiber array; and coupling the outgoing ones of the optical signals from the optical fibers to the free-space optical communication using the couplers.

21. The method of claim 15, further comprising amplifying the optical signals with amplifiers in optical communication with the fiber array and preserving the linear polarization of the optical signals.

22. The method of claim 15, further comprising measuring the optical signals with detectors arranged in optical communication with the fiber array.

* * * * *